United States Patent
Wong et al.

(10) Patent No.: US 10,412,758 B2
(45) Date of Patent: Sep. 10, 2019

(54) HANDLING NUMBER OF REPETITIONS IN COVERAGE EXTENSION MODE

(71) Applicant: SONY CORPORATION, Tokyo (JP)

(72) Inventors: Shin Horng Wong, Basingstoke (GB); Martin Warwick Beale, Basingstoke (GB)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/743,113

(22) PCT Filed: Jul. 21, 2016

(86) PCT No.: PCT/EP2016/067390
§ 371 (c)(1),
(2) Date: Jan. 9, 2018

(87) PCT Pub. No.: WO2017/029066
PCT Pub. Date: Feb. 23, 2017

(65) Prior Publication Data
US 2018/0376492 A1    Dec. 27, 2018

(30) Foreign Application Priority Data

Aug. 14, 2015 (EP) .................................... 15181174

(51) Int. Cl.
*H04W 4/00* (2018.01)
*H04W 72/12* (2009.01)
(Continued)

(52) U.S. Cl.
CPC ....... *H04W 72/1273* (2013.01); *H04L 1/0046* (2013.01); *H04L 1/0072* (2013.01); *H04L 1/08* (2013.01); *H04W 72/042* (2013.01)

(58) Field of Classification Search
CPC ....... H04L 1/0046; H04L 1/0072; H04L 1/08; H04W 72/042; H04W 72/1273
See application file for complete search history.

(56) References Cited

U.S. PATENT DOCUMENTS

| 6,577,873 B1* | 6/2003 | Kim ..................... H04W 16/00 375/355 |
| 2011/0205983 A1* | 8/2011 | Bharadwaj ........... H04L 1/0025 370/329 |

(Continued)

OTHER PUBLICATIONS

Holma, et al., "LTE for UMTS: OFDMA and SC-FDMA Based Radio Access", Wiley 2009, ISBN 978-0-470-99401-6, Total 4 pages.

(Continued)

Primary Examiner — Minh Trang T Nguyen
(74) Attorney, Agent, or Firm — Xsensus LLP

(57) ABSTRACT

A terminal device, useable in a wireless telecommunications system, including: a transceiver operable to perform radio signalling with a base station using a predetermined narrowband of bandwidth of the wireless telecommunications system; a controller operable to: control the transceiver to receive control information from the base station in a coverage extension mode. The control information schedules radio resources for radio signalling with the base station. In the coverage extension mode, transmission of the control information to the terminal device is repeated plural times. The control information is coded according to the number of times transmission of the control information is repeated. The control information is decoded to determine the number of times transmission of the control information is repeated. The transceiver performs radio signalling the base station using the radio resources scheduled by the control information after a predetermined time period following final repeat transmission of the control information elapsing.

20 Claims, 9 Drawing Sheets

(51) Int. Cl.
    *H04L 1/00*     (2006.01)
    *H04W 72/04*     (2009.01)
    *H04L 1/08*     (2006.01)

(56) References Cited

U.S. PATENT DOCUMENTS

| | | | |
|---|---|---|---|
| 2012/0163319 A1* | 6/2012 | Roessel | H04L 1/0003 370/329 |
| 2012/0163437 A1* | 6/2012 | Frederiksen | H04L 5/001 375/224 |
| 2014/0098761 A1* | 4/2014 | Lee | H04W 74/006 370/329 |
| 2014/0126549 A1* | 5/2014 | Beale | H04W 16/08 370/336 |
| 2015/0017977 A1* | 1/2015 | Ratasuk | H04W 88/10 455/426.1 |
| 2015/0181576 A1* | 6/2015 | Papasakellariou | H04L 5/0053 370/329 |

OTHER PUBLICATIONS

InterDigital, "Updated recommendation for UE-specific CRC", TSG-RAN Working Group 1 Ad Hoc, R1-01-1066, XP-002345604, Nov. 5-7, 2001, Total 3 pages.

ZTE, "Discussion on Control Channel Coverage Improvement", 3GPP TSG RAN WG1 Meeting #74bis, R1-134305, XP050717449, Oct. 7-11, 2013, Total 6 pages.

International Search Report dated Oct. 25, 2016 in PCT/EP2016/067390 filed Jul. 21, 2016.

\* cited by examiner

Localised and distributed forms of ePDCCH

HANDLING NUMBER OF REPETITIONS IN COVERAGE EXTENSION MODE

CROSS-REFERENCE TO RELATED APPLICATIONS

The present application is based on PCT/EP2016/067390 filed Jul. 21, 2016, and claims priority to European Patent Application 15 181 174.2, filed in the European Patent Office on Aug. 14, 2015, the entire contents of each of which being incorporated herein by reference.

TECHNICAL FIELD OF THE DISCLOSURE

The present disclosure relates to a terminal device, base station and methods.

BACKGROUND OF THE DISCLOSURE

Mobile communications system (or wireless telecommunications system) such as those which are being developed in accordance with the Long Term Evolution (LTE) project by the Third Generation Project Partnership (3GPP) can provide a facility for communications devices to transmit or receive data for a variety of applications with high data rates within a radio coverage area provided by a mobile communications network. A wireless access interface provided by the mobile communications network configured in accordance with an LTE standard includes signal transmission techniques which can support these high data rates. There is therefore expected to be a variety of applications, which can be supported by an LTE system.

Although there are applications which require high data rates to support their operation, there are some applications in which high data rates are not required. Indeed there are some applications which are expected to be provided by more simple, less complicated communications devices such as those supporting machine type communications (MTC). Such devices are also expected to be low power devices and may include a relatively inexpensive low complexity, narrowband, transmitter and receiver. Such devices may also be deployed in locations in which radio communications conditions can make transmission and reception of signals more difficult.

A technique which has been proposed to improve a likelihood of communications devices to receive signals transmitted by a mobile communications network using an existing transmission format is to repeat a transmission of a signal representing a message from a mobile communications network. A receiver can combine the repeatedly received message to improve a likelihood of correctly detecting the message. Therefore a mobile communications network can be arranged to extend its radio coverage, particularly for less complicated mobile communications devices. Such a technique is known as coverage extension (or coverage enhancement).

However, the use of repeated message transmission so as to allow such coverage extension for narrowband transmitters and receivers may be problematic. The present technique aims to alleviate these problems.

SUMMARY OF THE DISCLOSURE

In a first aspect, the present disclosure provides terminal device for use in a wireless telecommunications system, the terminal device comprising: a transceiver operable to perform radio signalling with a base station using a predetermined narrowband of the bandwidth of the wireless telecommunications system; and a controller operable to: control the transceiver to receive control information from the base station in a coverage extension mode of the wireless telecommunications system, wherein: the control information schedules radio resources for radio signalling with the base station; the coverage extension mode is a mode in which transmission of the control information to the terminal device is repeated a plurality of times; and the control information is coded according to the number of times that the transmission of the control information is repeated; decode the control information to determine the number of times that the transmission of the control information is repeated; and control the transceiver to perform radio signalling with the base station using the radio resources scheduled by the control information after a predetermined time period following the final repeat transmission of the control information has elapsed.

In an embodiment, the control information is coded using a coding scheme associated with the number of times that the transmission of the control information is repeated, the coding scheme being one of a plurality of predetermined coding schemes each associated with a respective number of times that the transmission of the control information is repeatable; and the controller is operable to: perform a decoding process using each coding scheme in the plurality of predetermined coding schemes; determine which coding scheme in the plurality of predetermined coding schemes successively decodes the control information; and determine the number of times that the transmission of the control information is repeatable which is associated with the coding scheme which successively decodes the control information as the number of times that the transmission of the control information is repeated.

In an embodiment, the coding scheme used for coding the control information is masked onto a cyclic redundancy check (CRC) of a signal comprising the control information which is transmitted to the terminal device by the base station; and the controller is operable to perform the decoding process using each coding scheme in the plurality of predetermined coding schemes by applying each coding scheme to the CRC of the signal comprising the control information which is received from the base station.

In an embodiment, each coding scheme in the plurality of predetermined coding schemes is a function of an identifier of the terminal device and a different one of the predetermined number of times that the transmission of the control information is repeatable.

In an embodiment, the coding scheme used for coding the control information is applied onto information bits prior to channel encoding of a signal comprising the control information which is transmitted to the terminal device by the base station; and the controller is operable to perform the decoding process using each coding scheme in the plurality of predetermined coding schemes by applying each coding scheme to the signal comprising the control information which is received from the base station after channel decoding of the signal.

In an embodiment, the coding scheme used for coding the control information is applied to a signal comprising the control information which is transmitted to the terminal device by the base station after channel encoding of the signal; and the controller is operable to perform the decoding process using each coding scheme in the plurality of predetermined coding schemes by applying each coding scheme to the signal comprising the control information which is received from the base station prior to channel decoding of the signal.

In an embodiment, the coding scheme used for coding the control information is applied onto the symbol of the modulated & channel encoded control information which is transmitted to the terminal device by the base station; and the controller is operable to perform the decoding process using each coding scheme in the plurality of predetermined coding schemes by applying each coding scheme to the symbol of the modulated and channel encoded control information which is received from the base station.

In an embodiment, the coding scheme used for coding the control information is applied onto the radio resource elements of a pair of physical resource blocks (PRBs) of the modulated and channel encoded control information which is transmitted to the terminal device by the base station; and the controller is operable to perform the decoding process using each coding scheme in the plurality of predetermined coding schemes by applying each coding scheme to the radio resource elements of the pair of PRBs of the modulated and channel encoded control information which is received from the base station.

In an embodiment, a first and second number of times that the transmission of the control information is repeatable are each associated with the same, shared coding scheme.

In an embodiment, the controller is operable to, following decoding of control information using the shared coding scheme, determine the number of times that the control information is repeated based on an identifier in the control information.

In an embodiment, the coding is one of scrambling or interleaving and the decoding is one of descrambling or de-interleaving.

In an embodiment, the predetermined coding schemes are one of scrambling codes or interleaving functions.

In a second aspect, the present disclosure provides a base station for use in a wireless telecommunications system, the base station comprising: a transceiver operable to perform radio signalling with a terminal device using a predetermined narrowband of the bandwidth of the wireless telecommunications system; and a controller operable to: generate control information to be transmitted to the terminal device in a coverage extension mode of the wireless telecommunications system, wherein: the control information schedules radio resources for radio signalling with the terminal device; and the coverage extension mode is a mode in which transmission of the control information to the terminal device is repeated a plurality of times; determine the number of times that transmission of the control information to the terminal device is to be repeated; code the control information according to the determined number of times that the transmission of the control information to the terminal device is to be repeated; control the transceiver to repeatedly transmit the coded control information to the terminal device according to the determined number of times that the transmission of the control information to the terminal device is to be repeated; and control the transceiver to perform radio signalling with the terminal device using the radio resources scheduled by the control information after a predetermined time period following the final repeat transmission of the control information has elapsed.

In an embodiment, the controller is operable to code the control information using a coding scheme associated with the number of times that the transmission of the control information is to be repeated, the coding scheme being one of a plurality of predetermined coding schemes each associated with a respective number of times that the transmission of the control information is repeatable.

In an embodiment, the controller is operable to mask the coding scheme used for coding the control information onto a cyclic redundancy check (CRC) of a signal comprising the control information which is to be transmitted to the terminal device.

In an embodiment, each coding scheme in the plurality of predetermined coding schemes is a function of an identifier of the terminal device and a different one of the predetermined number of times that the transmission of the control information is repeatable.

In an embodiment, the controller is operable to apply the coding scheme used for coding the control information onto information bits prior to channel encoding of a signal comprising the control information which is to be transmitted to the terminal device.

In an embodiment, the controller is operable to apply the coding scheme used for coding the control information to a signal comprising the control information which is to be transmitted to the terminal device after channel encoding of the signal.

In an embodiment, the controller is operable to apply the coding scheme used for coding the control information onto the symbol of the modulated and channel encoded control information which is to be transmitted to the terminal device.

In an embodiment, the controller is operable to apply the coding scheme used for coding the control information onto the radio resource elements of a pair of physical resource blocks (PRBs) of the modulated and channel encoded control information which is to be transmitted to the terminal device.

In an embodiment, a first and second number of times that the transmission of the control information is repeatable are each associated with the same, shared coding scheme.

In an embodiment, the controller is operable to add an identifier to the control information when the transmission of the control information is to be repeated the first or second number of times, the identifier identifying which of the first or second number of times the transmission of the control information is to be repeated.

In an embodiment, the coding is one of scrambling or interleaving and the decoding is one of descrambling or de-interleaving.

In an embodiment, the predetermined coding schemes are one of scrambling codes or interleaving functions.

In a third aspect, the present disclosure provides a wireless telecommunications system comprising a terminal device according to the first aspect and a base station according to the second aspect.

In a fourth aspect, the present disclosure provides a method of operating a terminal device in a wireless telecommunications system, the terminal device being for performing radio signalling with a base station using a predetermined narrowband of the bandwidth of the wireless telecommunications system, the method comprising: receiving control information from the base station in a coverage extension mode of the wireless telecommunications system, wherein: the control information schedules radio resources for radio signalling with the base station; the coverage extension mode is a mode in which transmission of the control information to the terminal device is repeated a plurality of times; and the control information is coded according to the number of times that the transmission of the control information is repeated; decoding the control information to determine the number of times that the transmission of the control information is repeated; and performing radio signalling with the base station using the radio resources scheduled by the control information after a predetermined time period following the final repeat transmission of the control information has elapsed.

In a fifth aspect, the present disclosure provides a storage medium storing a computer program for controlling a computer to perform a method according to the fourth aspect.

In a sixth aspect, the present disclosure provides a method of operating a base station in a wireless telecommunications system, the base station being for performing radio signalling with a terminal device using a predetermined narrowband of the bandwidth of the wireless telecommunications system, the method comprising: generating control information to be transmitted to the terminal device in a coverage extension mode of the wireless telecommunications system, wherein: the control information schedules radio resources for performing radio signalling with the terminal device; and the coverage extension mode is a mode in which transmission of the control information to the terminal device is repeated a plurality of times; determining the number of times that transmission of the control information to the terminal device is to be repeated; coding the control information according to the determined number of times that the transmission of the control information to the terminal device is to be repeated; repeatedly transmitting the coded control information to the terminal device according to the determined number of times that the transmission of the control information to the terminal device is to be repeated; and performing radio signalling with the terminal device using the radio resources scheduled by the control information after a predetermined time period following the final repeat transmission of the control information has elapsed.

In a seventh aspect, the present disclosure provides a storage medium storing a computer program for controlling a computer to perform a method according to the sixth aspect.

In an eighth aspect, the present disclosure provides a terminal device for use in a wireless telecommunications system, the terminal device comprising: transceiver circuitry operable to perform radio signalling with a base station using a predetermined narrowband of the bandwidth of the wireless telecommunications system; and controller circuitry operable to: control the receiver circuitry to receive control information from the base station in a coverage extension mode of the wireless telecommunications system, wherein: the control information schedules radio resources for radio signalling with the base station; the coverage extension mode is a mode in which transmission of the control information to the terminal device is repeated a plurality of times; and the control information is coded according to the number of times that the transmission of the control information is repeated; decode the control information to determine the number of times that the transmission of the control information is repeated; and control the transceiver circuitry to perform radio signalling from the base station using the radio resources scheduled by the control information after a predetermined time period following the final repeat transmission of the control information has elapsed.

In a ninth aspect, the present disclosure provides a base station for use in a wireless telecommunications system, the base station comprising: transceiver circuitry operable to perform radio signalling with a terminal device using a predetermined narrowband of the bandwidth of the wireless telecommunications system; and controller circuitry operable to: generate control information to be transmitted to the terminal device in a coverage extension mode of the wireless telecommunications system, wherein: the control information schedules radio resources for radio signalling with the terminal device; and the coverage extension mode is a mode in which transmission of the control information to the terminal device is repeated a plurality of times; determine the number of times that transmission of the control information to the terminal device is to be repeated; code the control information according to the determined number of times that the transmission of the control information to the terminal device is to be repeated; control the transceiver circuitry to repeatedly transmit the coded control information to the terminal device according to the determined number of times that the transmission of the control information to the terminal device is to be repeated; and control the transceiver circuitry to perform radio signalling with the terminal device using the radio resources scheduled by the control information after a predetermined time period following the final repeat transmission of the control information has elapsed.

Various further aspects and features of the present disclosure are defined in the appended claims and include a communications device, a method of communicating using a communications device.

BRIEF DESCRIPTION OF DRAWINGS

Embodiments of the present disclosure will now be described by way of example only with reference to the accompanying drawings wherein like parts are provided with the same reference numerals and in which.

DESCRIPTION OF EXAMPLE EMBODIMENTS

Communications System

Figure 1:
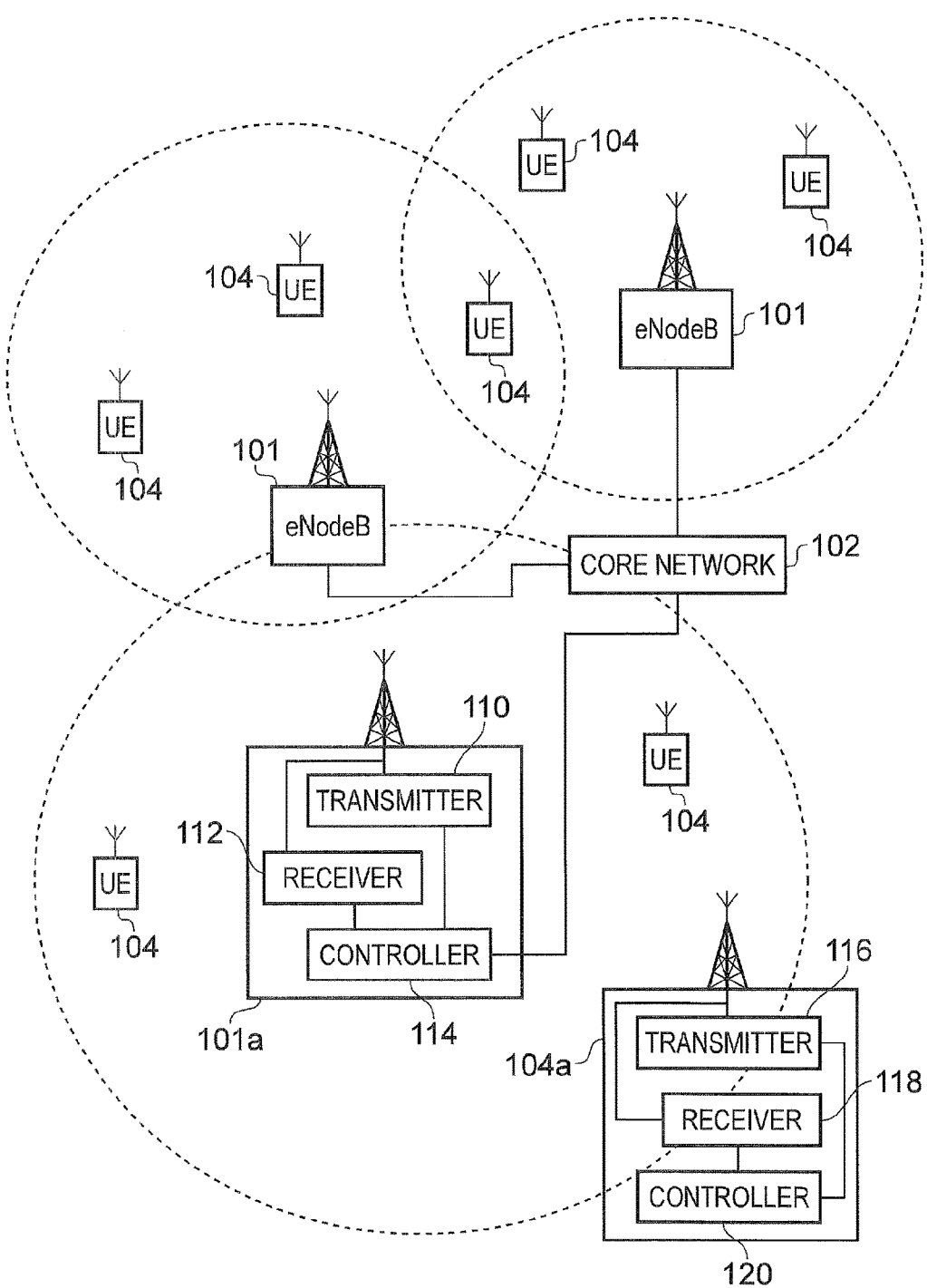
FIG. 1 provides a schematic block diagram of a mobile communications system in which communications devices are communicating via infrastructure equipment.

FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

FIG. 1 provides a schematic diagram of a mobile telecommunications system, where the system includes infrastructure equipment comprising base stations 101 which are connected to a core network 102, which operates in accordance with a conventional arrangement which will be understood by those acquainted with communications technology. The infrastructure equipment 101 may also be referred to as a base station, network element, infrastructure apparatus, enhanced Node B (eNodeB) or a coordinating entity for example, and provides a wireless access interface to the one or more communications devices within a coverage area or cell represented by a broken line 103. One or more mobile communications devices 104 may communicate data via the transmission and reception of signals representing data using the wireless access interface. The core network 102 may also provide functionality including authentication, mobility management, charging and so on for the communications devices served by the network entity.

The mobile communications devices of FIG. 1 may also be referred to as communications terminals, user equipment (UE), terminal devices and so forth, and are configured to communicate with one or more other communications devices served by the same or a different coverage area via the network entity. These communications may be performed by transmitting and receiving signals representing data using the wireless access interface over the two way communications links.

The communications system may operate in accordance with any known protocol, for instance in some examples the system may operate in accordance with a 3GPP Long Term Evolution (LTE) standard.

As shown in FIG. 1, one of the base stations 101a is shown in more detail to include a transmitter 110 for transmitting signals via a wireless access interface to the one or more communications devices or UEs 104, and a receiver 112 to receive signals from the one or more UEs within the coverage area 103. A controller 114 controls the transmitter 110 and the receiver 112 to transmit and receive the signals via the wireless access interface. The controller 114 may perform a function of controlling the allocation of communications resource elements of the wireless access interface and may in some examples include a scheduler for scheduling transmissions via the wireless access interface for both an uplink and the downlink.

An example UE 104a is shown in more detail to include a transmitter 116 for transmitting signals on the uplink of the wireless access interface to the eNodeB 103 and a receiver 118 for receiving signals transmitted by the base station 101 on the downlink via the wireless access interface. The transmitter 116 and the receiver 118 are controlled by a controller 120. In the embodiments of the present disclosure, the UE 104a is a Low Complexity Machine Type Communication (LC-MTC) terminal device.

LTE Wireless Access Interface

Mobile telecommunications systems such as those arranged in accordance with the 3GPP defined Long Term Evolution (LTE) architecture use an orthogonal frequency division modulation (OFDM) based wireless access interface for the radio downlink (so-called OFDMA) and a single carrier frequency division multiple access scheme (SC-FDMA) on the radio uplink. The down-link and the up-link of a wireless access interface according to an LTE standard is presented in FIGS. 2 and 3.

Figure 2:
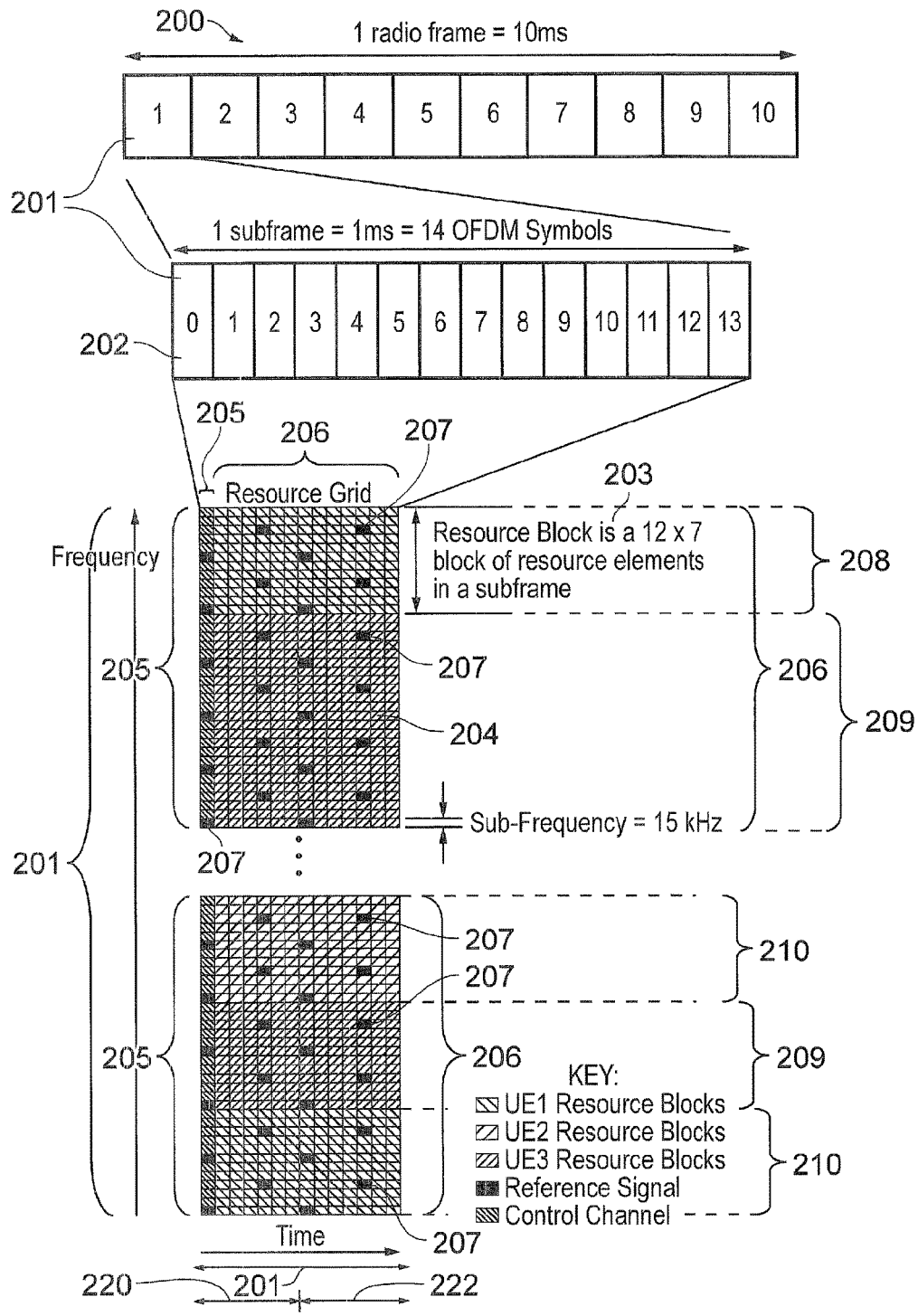
FIG. 2 provides a schematic diagram of a structure of a downlink of a wireless access interface of a mobile communications system operating according to an LTE standard.

FIG. 2 provides a simplified schematic diagram of the structure of a downlink of a wireless access interface that may be provided by or in association with the base station of FIG. 1 when the communications system is operating in accordance with the LTE standard. In LTE systems the wireless access interface of the downlink from a base station to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHZ and 20 MHz bandwidth may be divided into orthogonal subcarriers. Not all of these subcarriers are used to transmit data (some are used for features such as the cyclic prefix of the OFDM symbols). The number of subcarriers varies between 72 subcarriers (1.4 MHz) and 1200 subcarriers (20 MHz). In some examples the subcarriers are grouped on a basis of $2^n$, for example 128 to 2048, so that both a transmitter and a receiver can use an inverse and a forward Fast Fourier Transform to convert the sub-carriers from the frequency domain to the time domain and from the time domain to the frequency domain respectively. Each subcarrier bandwidth may take any value but in LTE it is fixed at 15 kHz. As shown in FIG. 2, the resources of the wireless access interface are also temporally divided into frames where a frame 200 lasts 10 ms and is subdivided into 10 subframes 201 each with a duration of 1 ms. Each subframe 201 is formed from 14 OFDM symbols and is divided into two slots 220, 222 each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. More details of the down-link structure of the LTE wireless access interface are provided in Annex 1. However of particular relevance in understanding the example embodiments of the present technique are the downlink control channel referred to as the physical downlink control channel (PDCCH) and a shared channel of resources for transmitting data to UEs which is the physical downlink shared channel (PDSCH).

Figure 3:
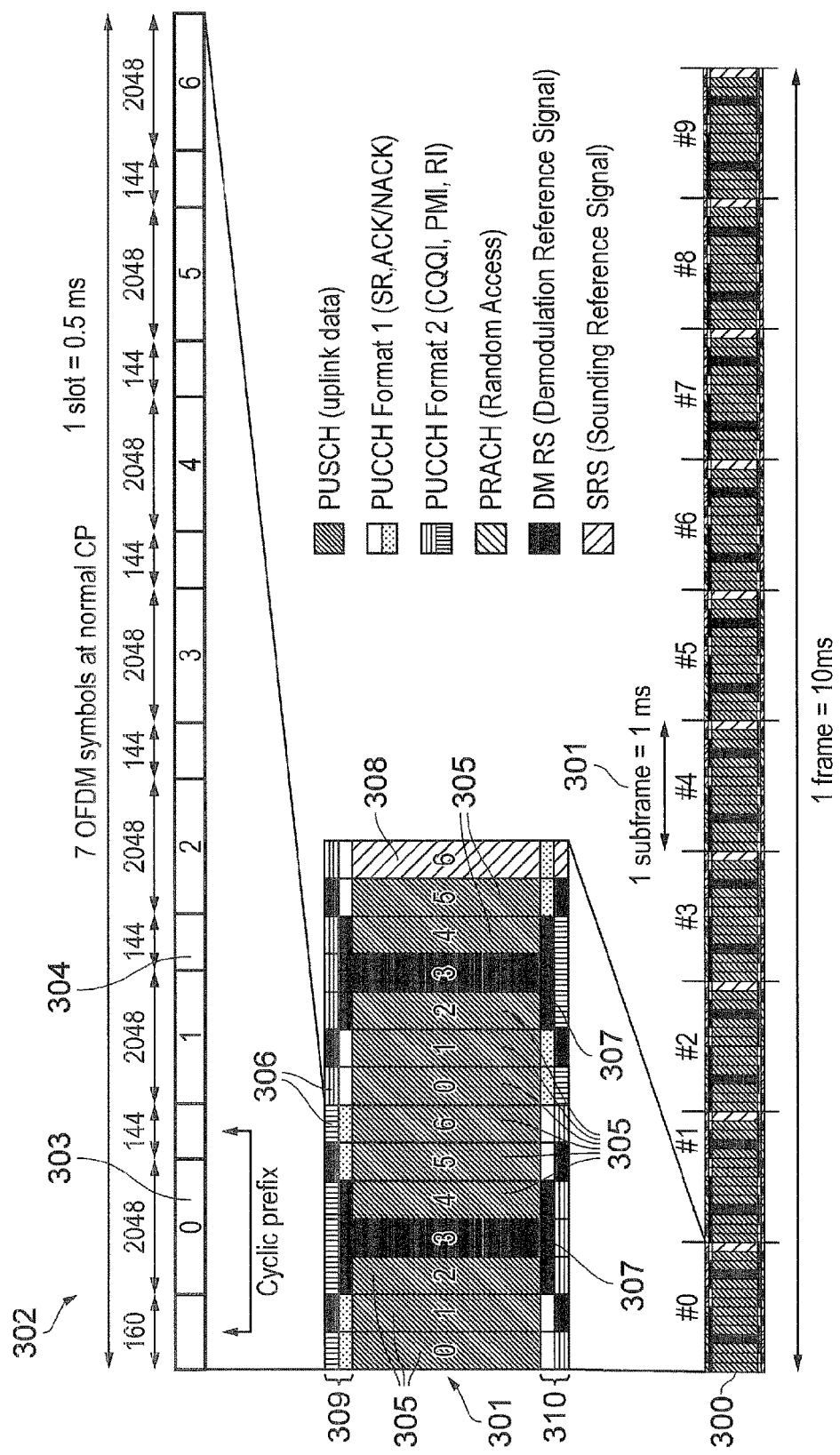
FIG. 3 provides a schematic diagram of an uplink of a wireless access interface of a mobile communications system operating according to an LTE standard.

FIG. 3 provides a simplified schematic diagram of the structure of an uplink of an LTE wireless access interface that may be provided by or in association with the base station of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. More details of the LTE up-link represented in FIG. 3 are provided in Annex 1.

The LTE data or datagram is transmitted on the PDSCH on the downlink and on the PUSCH in the uplink. The resources on the PDSCH and the PUSCH are allocated to the terminal device by the base station. Prior to 3GPP Rel-11, the PDCCH was used to allocate these channels. From Rel-11, it has also been possible to allocate these channels using an enhanced PDCCH (ePDCCH).

ePDCCH Structure

Figure 4:
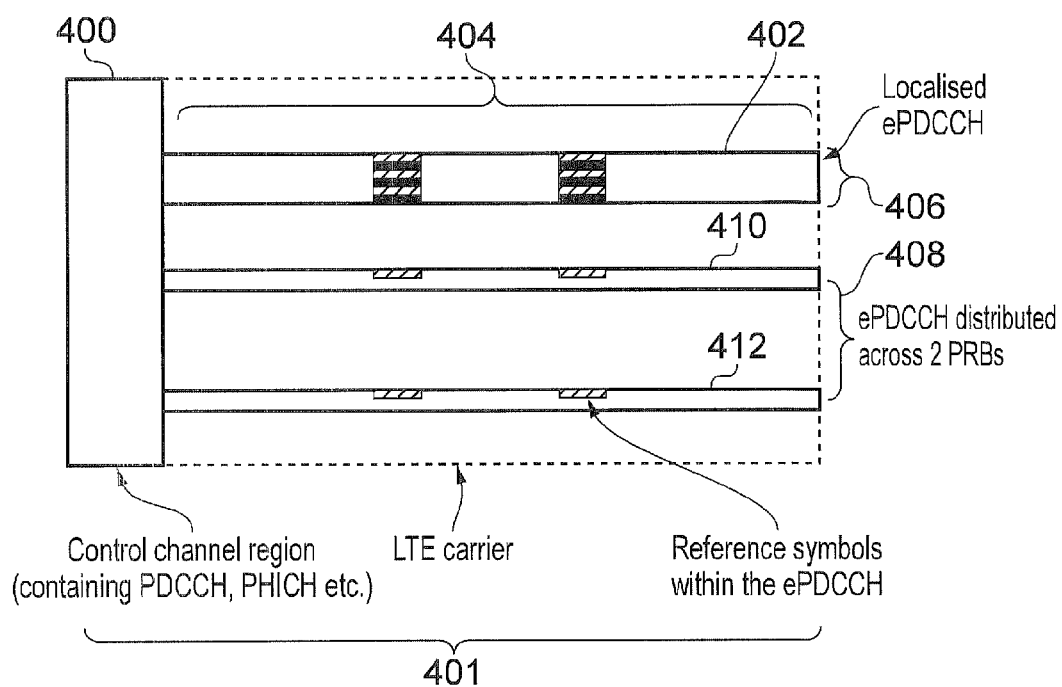
FIG. 4 is a schematic representation of a subframe of a wireless access interface, which includes a localised ePDCCH and a distributed ePDCCH.

FIG. 4 provides a schematic representation of a subframe in which an ePDCCH forms part of a wireless access interface according to an LTE standard. As shown in FIG. 4 a conventional control channel region 400 is shown within a subframe 401 which is transmitted in the first of the 1 to 3 OFDM symbols of the subframe 401. This example control channel corresponds to a conventional PDCCH 400 and is transmitted across the available bandwidth of the wireless access interface. In contrast, a localised enhanced PDCCH 402 is transmitted in time across the remaining part of the subframe 404 within a narrow band of frequency sub-carriers 406. An alternative example of an ePDCCH 408 comprises a first part 410 transmitted across a first group of frequencies and a second part 412 transmitted in the second group of frequencies so that the ePDCCH is distributed across two physical resource blocks.

As noted above, a wireless access interface according to an LTE standard provides for the transmission of non-access stratum data, such as user data, on the PDSCH on the downlink and on the PUSCH in the uplink. Communications resource elements on the PDSCH and PUSCH are allocated to the UE by the base station. Prior to 3GPP Release-11, the PDCCH was used to allocate these channels. From Release-11, it has also been possible to allocate these channels using an enhanced PDCCH (the ePDCCH). Therefore, effectively for the example shown in FIG. 4, the same control channel information can be transmitted on the PDCCH 400 or on the ePDCCH 402, 408 for either of the arrangements of the control channel arrangements shown in FIG. 4.

As can be appreciated from FIG. 4, the ePDCCH is essentially a narrowband control channel. As shown in FIG. 4, the ePDCCH can be transmitted in either a localized mode as shown for the first example 402 or in a distributed mode as shown for the second example 408. For the example of a localised mode of allocation, the ePDCCH can occupy a single PRB (physical resource block=12 OFDM subcarriers). It can also occupy a contiguous set of plural PRBs. When the base station (eNodeB) has knowledge about the channel conditions of the terminal device (UE), it can choose a physical resource block (PRB) that has particularly favourable channel conditions for the terminal device (e.g. avoiding fades). The base station can also choose a beam-forming codebook entry to produce a beam that is targeted at that terminal device.

In a distributed mode of allocation, the ePDCCH occupies at least two PRBs. This mode of allocation is preferable when the base station does not have measurements or an indication representing radio channel conditions at the terminal device. This might occur for example if the terminal device is operating at a high speed, such that, for example, feedback from the terminal device is out of date when it arrives at the base station, or a dedicated beam from the base station cannot track a terminal device's position quickly enough, or when feedback from the terminal device is intermittent, for example when the UE is operating with a low data rate bursty traffic model.

Coverage Enhancement and MDPCCH

Low Complexity Machine Type Communication (LC-MTC) terminal devices (UEs) are currently being specified in 3GPP. The main features of LC-MTC UE are low complexity (and therefore low cost), coverage enhancement and reduced power consumption.

The main technique to reduce complexity for LC-MTC UE is to restrict the UE to operate within 6 PRBs. The bandwidth of the wireless telecommunications system is therefore divided into multiple 6 PRB narrowbands and the LC-MTC UE is expected to be able to tune into any of these narrowbands.

In the coverage enhancement (CE) feature, the coverage for LC-MTC is extended by 15 dB (relative to that of Cat-1 UE). The main technique for CE is via numerous repetitions of the same message.

Downlink Control Information (DCI) is sent to the UE by the eNB for scheduling and control purposes. In the legacy system DCI can be sent using the Enhanced Physical Downlink Control Channel (EPDCCH), as explained above. There are multiple EPDCCH candidates where each EPDCCH candidate occupies different resources. These candidates are signalled to the UE and the set of different EPDCCH candidates forms a search space. The eNB transmits the DCI using one of the EPDCCH candidates and hence the UE needs to blind decode for the EPDCCH, that is, try all possible EPDCCH candidates within the search space until it detects the EPDCCH used by the eNB. It is noted that the eNB may not transmit any DCI to the UE and in this case, the UE will not detect any EPDCCH.

For LC-MTC, the DCI is carried by MPDCCH (where the 'M' is currently understood to stand for "machine"). MPDCCH is based on the EPDCCH design. In a coverage enhancement mode, the MPDCCH is repeated over a plurality of subframes so as to allow an LC-MTC UE to determine the control information carried by the MPDCCH even in a poor coverage area. The MDPCCH comprising the DCI is an example of control information, control information being any information which schedules downlink radio resources for radio transmission from a base station to a terminal device and/or uplink radio resources for radio transmission from a terminal device to a base station.

It has been agreed in 3GPP that the radio resources scheduled by the control information of the MPDCCH for channel PDSCH (downlink) and/or PUSCH (uplink) would start at a known offset after the end of the MPDCCH transmission. That is if MPDCCH ends in subframe n, the PDSCH (or PUSCH) would start in subframe n+k, where k is a known offset.

Figure 5:
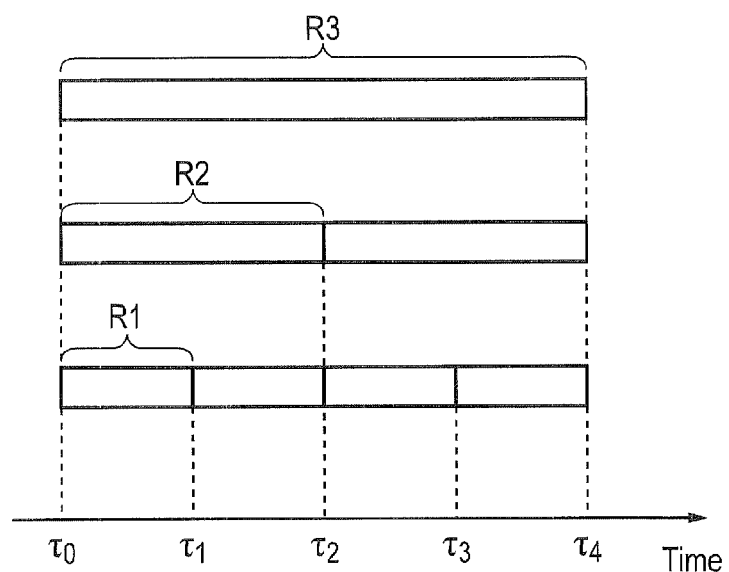
FIG. 5 provides a schematic diagram of an example search space of three different MPDCCH repetitions.

As previously mentioned, in order to reach an LC-MTC UE in the coverage enhancement (CE) region, MPDCCH needs to be repeated numerous times. It was agreed in 3GPP that different number of repetitions can be used for MPDCCH in a search space of a CE level and that the LC-MTC would blind decode for the repetition used. Hence MPDCCH candidates can have different repetitions. FIG. 5 shows an example search space of three different MPDCCH repetitions, where R3 (1 candidate)>R2 (2 candidates)>R1 (4 candidates). To be clear, MPDCCH repetition R3 has the most number of repetitions (representing the poorest radio condition), following by R2, followed by R1. FIG. 5, shows an example representation of how different MPDCCH repetitions are arranged in a search space. Here we have one instance (time $\tau 0$ to $\tau 4$) where MPDCCH candidates with R3 repetitions can occur within the search space. There are two instances (time $\tau 0$ to $\tau 2$ and time $\tau 2$ to $\tau 4$) where MPDCCH candidates with R2 repetitions can occur within the search space and four instances (time $\tau 0$ to $\tau 1$, time $\tau 1$ to $\tau 2$, time $\tau 2$ to $\tau 3$ and time $\tau 3$ to $\tau 4$) where MPDCCH candidates can occur within the search space.

In FIG. 5, the search space starts at time T0 and the LC-MTC UE starts accumulating (and decoding) for a MPDCCH. It is possible that an LC-MTC UE in a more favourable radio condition can decode a MPDCCH with less than the transmitted repetitions. For example, if the eNB used MPDCCH with repetition R3 to send the DCI, the UE in a good radio condition can decode this candidate with only R2 repetitions and hence completes its decoding at time $\tau 2$ (instead of the expected time $\tau 4$). However, since the PDSCH (or PUSCH) starts at a fixed time offset, for example, $\tau k$, after the end of MPDCCH, and the LC-MTC UE has no prior knowledge of the repetition level used for the MPDCCH, the UE will wrongly assume that the R3 MPDCCH is sent with repetition R2 (because the decoding was completed in time $\tau 2$ instead of time $\tau 4$) and will therefore wrongly determine the PDSCH (or PUSCH) to start at time $\tau 2+\tau k$. This is wrong because the intended PDSCH (or PUSCH) actually starts at time $\tau 4+\tau k$. This will lead to a failed PDSCH reception (or failed PUSCH transmission). It is noted that the MPDCCH repetition level may be determined by the eNB using any suitable method known in the art. For example, the repetition level may be determined on the basis of feedback from a UE, trial and error, network congestion, etc.

It is noted that a number of solutions have been proposed in an attempt to overcome this problem.

Figure 6:
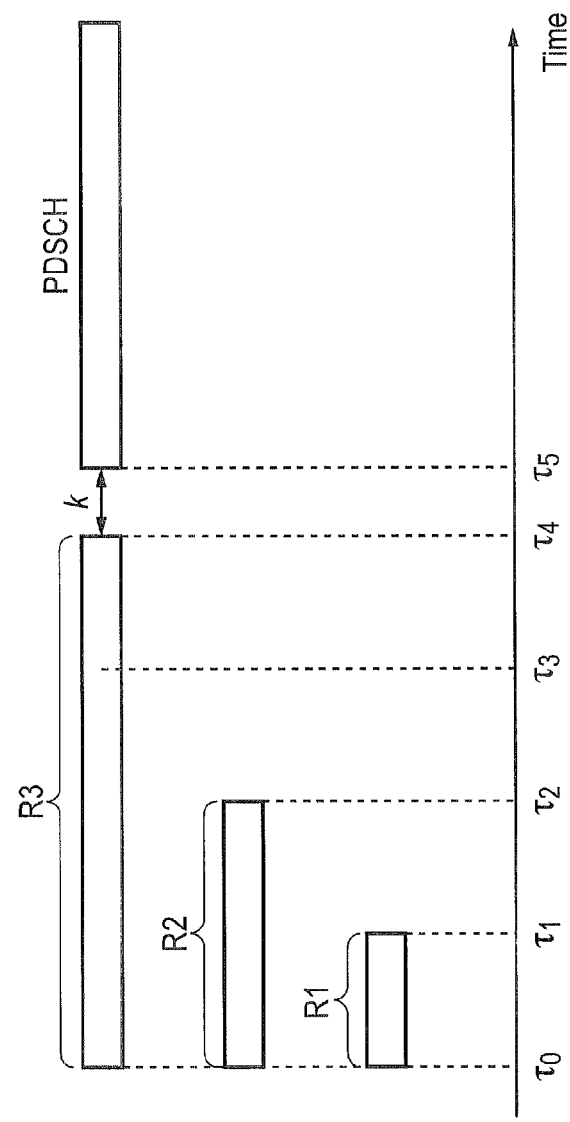
FIG. 6 provides a schematic diagram of the timing of three different MPDCCH repetitions relative to the timing of PDSCH (or PUSCH)

In one proposal, the subframe offset, k, is relative to the maximum possible MPDCCH repetition in the search space. That is, if the MPDCCH with the highest possible repetition ends in subframe n, the PDSCH (or PUSCH) would start in subframe n+k. Hence if there are 3 repetitions R1, R2 & R3 as shown in FIG. 6, PDSCH (or PUSCH) would always start at time $\tau 5$. This has the disadvantage that PDSCH reception (or PUSCH transmission) is delayed for smaller repetitions such as R1 & R2 (which are used in the majority of cases). Furthermore, this method reduces the opportunity to schedule PDSCH (or PUSCH), since nothing can be scheduled between the time $\tau 1$ and $\tau 4$.

In another proposal, the repetition of the MPDCCH is indicated in the DCI. However, this has the disadvantage in that it would increase the size of the DCI. In 3GPP the general consensus is to reduce the DCI size to avoid incurring higher repetition. This method therefore goes against the need to reduce DCI sizes, which is undesirable.

In another proposal, the starting location of the corresponding PDSCH or PUSCH is indicated in the DCI. Similar to the proposal of indicating the MPDCCH repetition in the DCI, this would increase the size of the DCI.

In another proposal, the symbol to resource element (RE) mapping is different for different repetition. However, the disadvantage of this is that changes to the RE mapping typically increases the complexity of the UE.

The present technique therefore aims to alleviate the above-mentioned problem relating to the subframe offset of the PDSCH (or PUSCH) whilst reducing the disadvantageous effects of the previously proposed solutions.

In the present technique, different scrambling is applied to different MPDCCH repetitions. For example in FIG. 5, all MPDCCH candidates with repetition R1 would use scrambling code S1, all MPDCCH candidates with repetition R2 will use scrambling code S2 and MPDCCH candidates with repetition R3 would use scrambling code S3. The scrambling is applied by the base station prior to transmission of the MPDCCH to an LC-MTC terminal device using narrowband radio signalling. The LC-MTC terminal device then attempts to perform descrambling of the received MPDCCH using each of the different scrambling codes. The LC-MTC will then know which repetition was used based on the specific scrambling code which successfully descrambles the MPDCCH. For example, if scrambling code S2 successfully descrambles the MPDCCH, then the LC-MTC will know that repetition R2 was used, if scrambling code S3 successfully descrambles the MPDCCH, then the LC-MTC will know that repetition R3 was used, etc. Advantageously, because the repetition of the MPDCCH is known by the LC-MTC, the LC-MTC then knows when the PDSCH is to be received (or the PUSCH transmitted) based on the time over which the repetition of the MPDCCH occurs and the time relating to the offset k (that is, $\tau k$). Even if the MDPCCH is decoded early, PDSCH reception (or PUSCH transmission) can thus occur successfully.

For example, take the previous example of the LC-MTC decoding the MPDCCH with repeat R3 early so that it finishes decoding at earlier time $\tau 2$ instead of expected time $\tau 4$. Because the LC-MTC knows (from the scrambling) that the MPDCCH has repetition R3, it still correctly determines the PDSCH reception (or PUSCH transmission) time to be $\tau 4+\tau k$ ($\tau 4$ being the time associated with the MPDCCH R3) rather than incorrectly determining the PDSCH reception (or PUSCH transmission) time to be $\tau 2+\tau k$ ($\tau 2$ being the time associated with the MPDCCH R2). PDSCH reception (or PUSCH transmission) thus occurs successfully using the present technique.

Thus, in an embodiment of the present technique, the controller 120 of an LC-MTC terminal device 104a controls the receiver 118 of the LC-MTC to receive control information (in the form of MPDCCH, for example) from a base station 101a in a coverage extension mode of the wireless telecommunications system. The control information schedules downlink radio resources (in the form of PDSCH, for example) for downlink radio signalling from the base station. The control information may also schedule uplink radio resources (in the form of PUSCH, for example) for uplink radio signalling to the base station. The coverage extension mode is a mode in which transmission of the control information to the terminal device is repeated a plurality of times. The control information is scrambled by the controller 114 of the base station 101a according to the number of times that the transmission of the control information is repeated. The controller 120 descrambles the control information to determine the number of times that the transmission of the control information is repeated. Furthermore, the controller 120 controls the receiver 118 to receive downlink radio signalling from the base station using the downlink radio resources scheduled by the control information after a predetermined time period (time $\tau k$) following the final repeat transmission (this indicating the end of, for example, time $\tau 4$ for MPDCCH repetition R3 or time $\tau 2$ for MPDCCH repetition R2) of the control information has elapsed. The controller 120 may also control the receiver 118 to transmit uplink radio signalling to the base station using uplink radio resources scheduled by the control information after the predetermined time period (time $\tau k$) following the final repeat transmission of the control information has elapsed.

Thus, it is noted that the control information may schedule radio resources for uplink and/or downlink radio signalling between the base station 101a and LC-MTC terminal device 104a. In other words, the control information may, in general, schedule radio resources for radio signalling between the base station 101a and LC-MTC terminal device 104a. It is noted that the receiver 112 and transmitter 110 of the base station 101a act as a transceiver which is able to both receive radio signalling from the LC-MTC 104a and transmit radio signalling (including the control information) to the LC-MTC 104a. Similarly, the receiver 118 and transmitter 120 of the LC-MTC 104a act as a transceiver which is able to both receive radio signalling (including the control information) from the base station 101a and transmit radio signalling to the base station 101a.

In an embodiment, the control information is scrambled using a scrambling code associated with the number of times that the transmission of the control information is repeated, the scrambling code being one of a plurality of predetermined scrambling codes each associated with a respective number of times (repetition number) that the transmission of the control information is repeatable. Thus, in the example of FIG. 5, the plurality of predetermined scrambling codes comprises code S1 (associated with repetition number R1 and used to scramble control information with repetition number R1), code S2 (associated with repetition number R2 and used to scramble control information with repetition number R2) and code S3 (associated with repetition number R3 and used to scramble control information with repetition number R3). The controller 120 of the LC-MTC thus performs a descrambling process using each scrambling code in the plurality of predetermined scrambling codes (thus, in the example of FIG. 1, the controller 120 will attempt to descramble received control information using each of the codes S1, S2, and S3). The controller 120 then determines which scrambling code in the plurality of predetermined scrambling codes successively descrambles the control information, and determines the repetition number associated with the scrambling code which successively descrambles the control information as the number of times that the transmission of the control information is repeated. Thus, in the example of FIG. 1, if the control information is successfully descrambled with scrambling code S3, then the controller 120 determines the repetition number of the control information to be R3, since this is the repetition number with which the scrambling code S3 is associated.

In an embodiment, at the base station, the scrambling code used for scrambling the control information is masked onto a cyclic redundancy check (CRC) of the signal comprising the control information which is to be transmitted to the LC-MTC. In this case, each different repetition is associated with a different identifier. Each different identifier may be a radio network temporary identifier (RNTI), for example. In particular, each different identifier may be an LC-MTC RNTI (for example, C-RNTI) which is a function of the control information repetition. For example if the UE RNTI is $ID_{UE}$, and the repetition used for MPDCCH is $R_{MPDCCH}$, then the RNTI $ID_{CRC}$ used to determine the scrambling code used to mask the CRC is:

$$ID_{CRC} = f(ID_{UE}, R_{MPDCCH})$$

That is, each scrambling code is a function of an identifier of an LC-MTC terminal device and a different one of the predetermined number of times that the transmission of the control information is repeatable. It is noted that, in this case, LC-MTC 104a applies the different scrambling codes to the signal comprising the control information which is received from the base station 101a at the CRC level (that is, at step 800 in FIG. 8—see below). A problem with this approach, however, that this may cause (rare case) collision of identifiers. For example $ID_{CRC}$ of one UE may clash with $ID_{CRC}$ of another UE.

Figure 7:
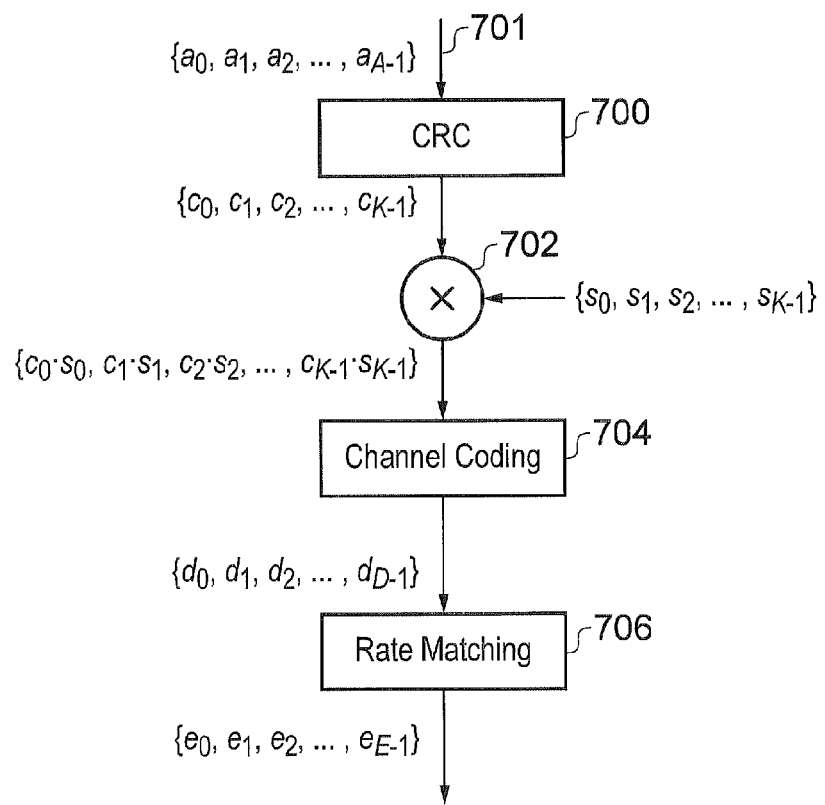
FIG. 7 provides a schematic diagram of steps carried out by a controller of a base station, according to an embodiment of the present technique.
Figure 8:
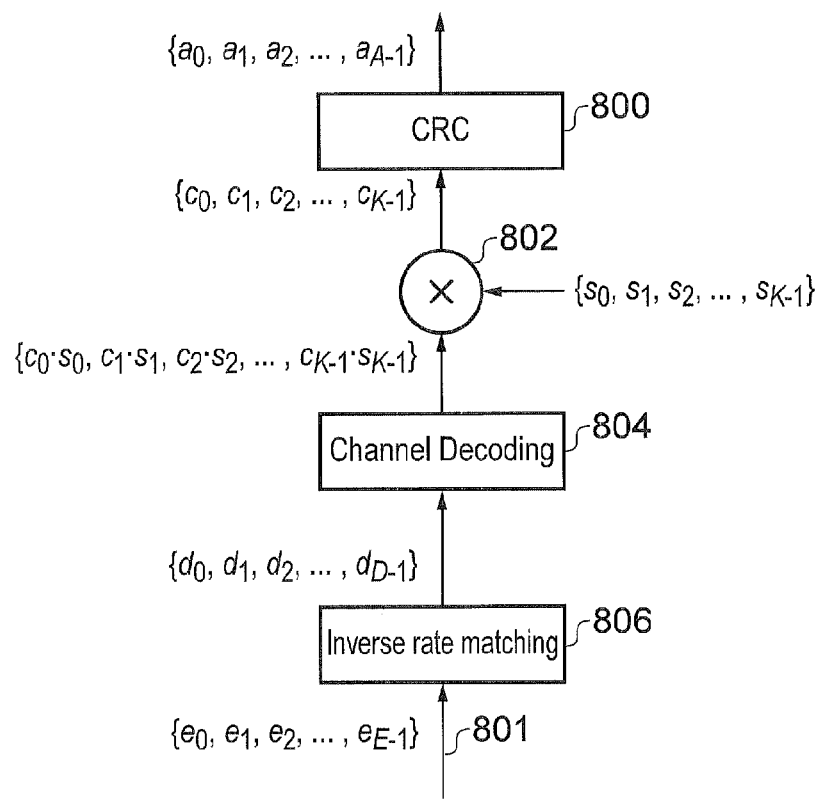
FIG. 8 provides a schematic diagram of steps carried out by a controller of a terminal device, according to an embodiment of the present technique.

In another embodiment, the scrambling code used for scrambling the control information is masked onto information bits prior to channel encoding (such as convolutional encoding) of the signal comprising the control information which is to be transmitted to the LC-MTC. An example of this is shown in FIG. 7, which shows the steps of CRC 700, channel coding 704 and rate matching 706 carried out by the controller 114 of the base station 101a on the signal 701 comprising the control information which is to be transmitted to the LC-MTC. In FIG. 7, the information bits are $C = \{c_0, c_1, c_2, \ldots, c_{K-1}\}$, the scrambling code is $S = \{s_0, s_1, s_2, \ldots, s_{K-1}\}$, and the resultant output is $\{c_0 \cdot s_0, c_1 \cdot s_1, c_2 \cdot s_2, \ldots, c_{K-1} \cdot s_{K-1}\}$. The masking of the scrambling code onto the information bits prior to the channel encoding is shown at step 702. An advantageous aspect of this embodiment is that, unlike the masking of the scrambling code on to the CRC, it does not use up RNTIs, thereby reducing the (small) possibility of RNTI collision. Furthermore, at the terminal device side, the LC-MTC terminal device 104a can perform the bulk of the decoding processing prior to testing different scrambling codes. Advantageously, this means that the processing intensive channel decoding is performed only once. FIG. 8 shows the steps of CRC 800, channel decoding 804 and inverse rate matching 806 carried out by the controller 120 of the LC-MTC 104a on the signal 801 comprising the control information which is received from the base station 101a. It can be seen that the different scrambling codes are applied to the signal at step 802, after the channel decoding has taken place at step 804.

In another embodiment, the scrambling code used for scrambling the control information is applied to the signal comprising the control information which is to be transmitted to the LC-MTC after (that is, at the output of) channel encoding 704 of the signal. In this case, prior to attempting to decode a repetition level, the LC-MTC's repetition decoded symbols are descrambled with the repetition level-specific scrambling code prior to decoding. That is, the LC-MTC applies the different scrambling codes prior to the channel decoding at step 804. At the base station, if the coded bitstream is $D = \{d_0, d_1, d_2, \ldots, d_{D-1}\}$ and the scrambling code sequence is $S = \{s_0, s_1, s_2, \ldots, s_D-1\}$, then the resultant symbol stream X that is rate-matched and transmitted:

$$X = \{d \cdot s_0, d_1 \cdot s_1, d_2 \cdot s_2, \ldots, d_{N-1} \cdot s_{N-1}\}$$

In another embodiment, the scrambling is performed at the symbol level, that is, the scrambling code S of a repetition level is masked onto the symbol. In other words, the scrambling code used for scrambling the control information is masked onto the modulated symbol of the channel encoded control information which is to be transmitted to the LC-MTC. That is, if the modulated symbols of the DCI are $G = \{g_0, g_1, g_2, \ldots, g_{N-1}\}$, and the scrambling code sequence is $S = \{s_0, s_1, s_2, \ldots, s_N-1\}$, then the resultant symbol stream X that is transmitted:

$$X = \{g_0 \cdot s_0, g_1 \cdot s_1, g_2 \cdot s_2, \ldots, g_{N-1} \cdot s_{N-1}\}$$

In this case, the LC-MTC applies the different scrambling codes to the modulated symbol comprising the (channel encoded & modulated) control information which is received from the base station. This occurs prior to the demodulation process (before inverse rate matching step 806 in FIG. 8).

Figure 9:
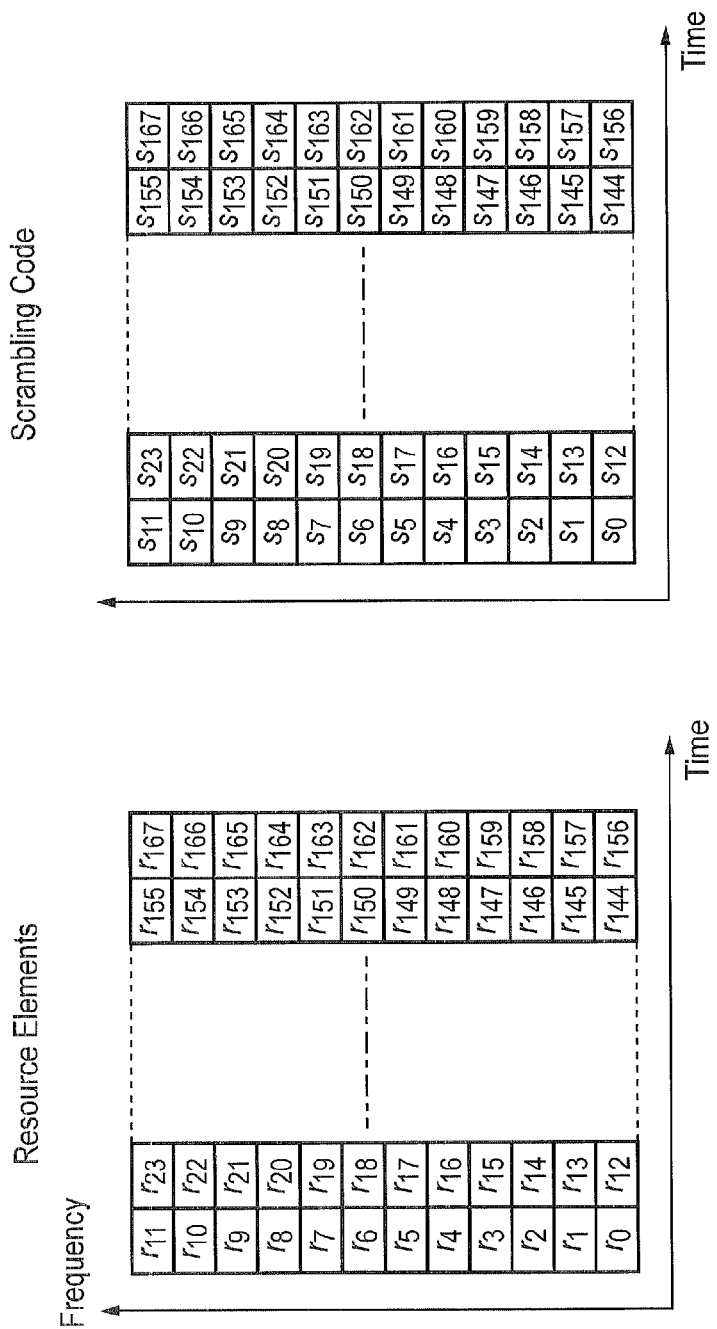
FIG. 9 provides a schematic diagram of resource elements in a physical resource block pair, according to an embodiment of the present technique.

In another embodiment, the scrambling is performed at the RE level, that is, the scrambling code S of a repetition level is masked onto the Resource Elements (RE) of a PRB pair. In other words, the scrambling code used for scrambling the (channel encoded & modulated) control information is masked onto the radio resource elements of a pair of PRBs which is to be transmitted to the LC-MTC. An example of REs in a PRB pair is shown in FIG. 9, where the REs are labelled as $\{r_1, r_2, \ldots, r_{M-1}\}$, where M is the number of REs in a PRB pair (typically M=168). The scrambling code $S=\{s_0, s_1, s_2, \ldots, s_{M-1}\}$ is therefore masked with the REs to give the resultant output X:

$$X=\{r_0 \cdot s_0, r_1 \cdot s_1, r_2 \cdot s_2, \ldots, r_{M-1} \cdot s_{M-1}\}$$

In this case, the LC-MTC applies the different scrambling codes to the radio resource elements of the pair of PRBs of the channel encoded and modulated control information which is received from the base station. This occurs prior to the demodulation process (which is prior to the inverse rate matching step 806 in FIG. 8).

The subframes in which MPDCCH are repeated may not have the same symbol to RE mapping, that is some REs in some subframes may not be able to contain MPDCCH symbols and hence by applying RE level scrambling, the same scrambling code to RE mapping is used in all subframes regardless if some REs may not contain MPDCCH symbols.

Testing each different scrambling code in order to determine the repetition of control information increases the number of required LC-MTC blind decode operations, especially when the number of possible repetition numbers is high (albeit the descrambling at information bit level effort is less than those at the symbol level since the channel decoding is performed only once for the information bit level case). In another embodiment, the same scrambling code is used for a plurality of repetition numbers. In other words, two or more different repetition numbers are each associated with the same, shared scrambling code. For example if there are four repetition numbers, namely repetition numbers R1, R2, R3 & R4 (where R4>R3>R2>R1), then scrambling code S1 may be used for repetitions R1 & R3 whilst scrambling code S2 may be used for repetition R4 & R2. This reduces the number of scrambling blind decoding at the LC-MTC. Following the successful descrambling of control information using a shared scrambling code, the LC-MTC therefore has a plurality of candidate repetition numbers. So, using the above-mentioned example, if the control information is successfully decoded using scrambling code S2, then the LC-MTC knows that the repetition number is either R2 or R4. One possible grouping implementation is such that the grouped repetitions, e.g. R4 & R2, would be unlikely to cause ambiguity because it is unlikely that a UE that requires R4 repetitions is able to decode an MPDCCH with R4 repetition using just R2 samples (i.e. separation between repetitions of a group is maximised). In this case, the LC-MTC will know the exact repetition used based on the time taken to decode the control information after descrambling. For example, if the descrambled MPDCCH is decoded in time τ2, then the LC-MTC will know that the repetition is R2, where as if the descrambled MPDCCH is descrambled in time τ4, then the LC-MTC will know that the repetition is R4.

As previously discussed, it has been proposed in the prior art that the repetition level of the MPDCCH is indicated in the DCI (that is, the repetition number is included in the control information itself). This, however, increases the size of the control information, especially when the number of possible repetition numbers is high, which is undesirable. On the other hand, not including the repetition number in the control information and instead having a large number of different scrambling codes each representing a possible repetition number (as described) results in a large number of blind decodes which must be carried out by the LC-MTC as each different scrambling code is tried. This can also be undesirable. Hence, as a compromise, in another embodiment, each scrambling code is used for a group of repetitions (as per the embodiment of the previous paragraph) and an indication in the control information distinguishes between the different repetitions within a group. Advantageously, this reduces the number of the scrambling code blind decoding attempts required and at the same time reduces size of the control information (for example, the number of DCI bits required to indicate the repetition of MPDCCH is reduced).

In another embodiment, instead of using a different scrambling of the control information for different repetitions, a different interleaving is used for different repetitions. Interleaving is a process of reordering. For example, consider the information bits of the signal comprising the control information which is to be transmitted. If we have a sequence of information bits {b1, b2, b3, b4, b5, b6, b7, b8, b9, b10}, an interleaving function may reorder this sequence to {b2, b1, b4, b3, b6, b5, b8, b7, b10, b9}, yet another could be {b6, b7, b8, b9, b10, b1, b2, b3, b4, b5}. Hence by applying different reordering or interleaving to different repetitions, the LC-MTC device can distinguish one repetition from another.

In such an interleaving embodiment, the control information is interleaved using an interleaving function associated with the number of times that the transmission of the control information is repeated, the interleaving function being one of a plurality of predetermined interleaving functions each associated with a respective number of times (repetition number) that the transmission of the control information is repeatable. Thus, in the example of FIG. 5, the plurality of predetermined interleaving function comprises function I1 (associated with repetition number R1 and used to interleave control information with repetition number R1), function I2 (associated with repetition number R2 and used to interleave control information with repetition number R2) and function I3 (associated with repetition number R3 and used to interleave control information with repetition number R3). The controller 120 of the LC-MTC thus performs a de-interleaving process using each interleaving function in the plurality of predetermined interleaving functions (thus, in the example of FIG. 1, the controller 120 will attempt to de-interleave received control information using each of the functions I1, I2, and I3). The controller 120 then determines which interleaving function in the plurality of predetermined interleaving functions successively de-interleave the control information, and determines the repetition number associated with the interleaving function which successively de-interleaves the control information as the number of times that the transmission of the control information is repeated. Thus, in the example of FIG. 1, if the control information is successfully de-interleaved with interleaving function I3, then the controller 120 determines the repetition number of the control information to be R3, since this is the repetition number with which the interleaving function I3 is associated. Interleaving (and de-interleaving) may be applied instead of scrambling (and descrambling) for any of the above-described embodiments. In particular, it is advantageous to use interleaving for the information bits of the signal comprising the control information. That is, an interleaving function used for interleaving the control information is applied onto information bits prior to channel encoding (such as convolutional encoding), comprising the control information which is to be transmitted to the LC-MTC. Thus, in FIG. 7, an interleaving function $I(R_{MPDCCH})$ would be applied to the information bits $C=\{c_0, c_1, c_2, \ldots, c_{K-1}\}$ prior to the channel coding at step 704, where $R_{MPDCCH}$ is the repetition used on the MPDCCH. It is noted that both scrambling and interleaving are referred to generally in the present disclosure as coding. That is, the control information is coded according to the number of times that the transmission of the control information is repeated. Whichever type of coding is used, each possible repeat number is associated with a respective coding scheme of the coding. Thus, for example, if scrambling is used as the coding, then each different repeat number is associated with a respective scrambling code, each scrambling code being a coding scheme of the scrambling. Alternatively, if interleaving is used as the coding, then each different repeat number is associated with a respective interleaving function, each interleaving function being a coding scheme of the interleaving. The controller 120 of an LT-MTC is thus operable to decode the control information to determine the number of times that the transmission of control information is repeated by attempting each possible coding scheme (for example, each scrambling code or each interleaving function) until the control information is decoded successfully. The number of repeats is determined by the LC-MTC depending on the specific coding scheme (for example, the specific scrambling code or interleaving function) which successfully decodes the control information.

It is noted that, in an embodiment, if the LC-MTC 104*a* successfully determines the control information before the repeated transmission of the control information has been completed, then the controller 120 of the LC-MTC may control the receiver 118 of the LC-MTC to shut down until the predetermined time period for receiving the downlink radio signalling (such as the PDSCH) has elapsed. For example, if the repeat of the control information is R3 (which is repeated over the time period τ4), but the LC-MTC is able to determine the control information after only a portion of the repeats at time τ2, then the controller 120 will control the receiver 118 to shut down until the time for receiving the PDSCH (τ4+τk) has elapsed. Advantageously, this results in reduced power consumption of the receiver 118.

Features of the present techniques can be generally described in the following numbered clauses:

1. A terminal device for use in a wireless telecommunications system, the terminal device comprising:
   a transceiver operable to perform radio signalling with a base station using a predetermined narrowband of the bandwidth of the wireless telecommunications system; and
   a controller operable to:
   control the transceiver to receive control information from the base station in a coverage extension mode of the wireless telecommunications system, wherein: the control information schedules radio resources for radio signalling with the base station; the coverage extension mode is a mode in which transmission of the control information to the terminal device is repeated a plurality of times; and the control information is coded according to the number of times that the transmission of the control information is repeated;
   decode the control information to determine the number of times that the transmission of the control information is repeated; and
   control the transceiver to perform radio signalling with the base station using the radio resources scheduled by the control information after a predetermined time period following the final repeat transmission of the control information has elapsed.

2. A terminal device according to clause 1, wherein:
   the control information is coded using a coding scheme associated with the number of times that the transmission of the control information is repeated, the coding scheme being one of a plurality of predetermined coding schemes each associated with a respective number of times that the transmission of the control information is repeatable; and
   the controller is operable to:
   perform a decoding process using each coding scheme in the plurality of predetermined coding schemes;
   determine which coding scheme in the plurality of predetermined coding schemes successively decodes the control information; and
   determine the number of times that the transmission of the control information is repeatable which is associated with the coding scheme which successively decodes the control information as the number of times that the transmission of the control information is repeated.

3. A terminal device according to clause 2, wherein:
   the coding scheme used for coding the control information is masked onto a cyclic redundancy check (CRC) of a signal comprising the control information which is transmitted to the terminal device by the base station; and
   the controller is operable to perform the decoding process using each coding scheme in the plurality of predetermined coding schemes by applying each coding scheme to the CRC of the signal comprising the control information which is received from the base station.

4. A terminal device according to clause 3, wherein:
   each coding scheme in the plurality of predetermined coding schemes is a function of an identifier of the terminal device and a different one of the predetermined number of times that the transmission of the control information is repeatable.

5. A terminal device according to clause 2, wherein:
   the coding scheme used for coding the control information is applied onto information bits prior to channel encoding of a signal comprising the control information which is transmitted to the terminal device by the base station; and
   the controller is operable to perform the decoding process using each coding scheme in the plurality of predetermined coding schemes by applying each coding scheme to the signal comprising the control information which is received from the base station after channel decoding of the signal.

6. A terminal device according to clause 2, wherein:
   the coding scheme used for coding the control information is applied to a signal comprising the control information which is transmitted to the terminal device by the base station after channel encoding of the signal; and
   the controller is operable to perform the decoding process using each coding scheme in the plurality of predetermined coding schemes by applying each coding scheme to the signal comprising the control information which is received from the base station prior to channel decoding of the signal.

7. A terminal device according to clause 2, wherein:
   the coding scheme used for coding the control information is applied onto the symbol of the modulated & channel encoded control information which is transmitted to the terminal device by the base station; and the controller is operable to perform the decoding process using each coding scheme in the plurality of predetermined coding schemes by applying each coding scheme to the symbol of the modulated and channel encoded control information which is received from the base station.

8. A terminal device according to clause 2, wherein:
the coding scheme used for coding the control information is applied onto the radio resource elements of a pair of physical resource blocks (PRBs) of the modulated and channel encoded control information which is transmitted to the terminal device by the base station; and
the controller is operable to perform the decoding process using each coding scheme in the plurality of predetermined coding schemes by applying each coding scheme to the radio resource elements of the pair of PRBs of the modulated and channel encoded control information which is received from the base station.

9. A terminal device according to any one of clauses 2 to 8, wherein:
a first and second number of times that the transmission of the control information is repeatable are each associated with the same, shared coding scheme.

10. A terminal device according to clause 9, wherein the controller is operable to, following decoding of control information using the shared coding scheme, determine the number of times that the control information is repeated based on an identifier in the control information.

11. A terminal device according to any preceding clause, wherein the coding is one of scrambling or interleaving and the decoding is one of descrambling or de-interleaving.

12. A terminal device according to any one of clauses 2 to 11, wherein the predetermined coding schemes are one of scrambling codes or interleaving functions.

13. A base station for use in a wireless telecommunications system, the base station comprising:
a transceiver operable to perform radio signalling with a terminal device using a predetermined narrowband of the bandwidth of the wireless telecommunications system; and
a controller operable to:
generate control information to be transmitted to the terminal device in a coverage extension mode of the wireless telecommunications system, wherein: the control information schedules radio resources for radio signalling with the terminal device; and the coverage extension mode is a mode in which transmission of the control information to the terminal device is repeated a plurality of times;
determine the number of times that transmission of the control information to the terminal device is to be repeated;
code the control information according to the determined number of times that the transmission of the control information to the terminal device is to be repeated;
control the transceiver to repeatedly transmit the coded control information to the terminal device according to the determined number of times that the transmission of the control information to the terminal device is to be repeated; and
control the transceiver to perform radio signalling with the terminal device using the radio resources scheduled by the control information after a predetermined time period following the final repeat transmission of the control information has elapsed.

14. A base station according to clause 13, wherein:
the controller is operable to code the control information using a coding scheme associated with the number of times that the transmission of the control information is to be repeated, the coding scheme being one of a plurality of predetermined coding schemes each associated with a respective number of times that the transmission of the control information is repeatable.

15. A base station according to clause 14, wherein:
the controller is operable to mask the coding scheme used for coding the control information onto a cyclic redundancy check (CRC) of a signal comprising the control information which is to be transmitted to the terminal device.

16. A base station according to clause 15, wherein:
each coding scheme in the plurality of predetermined coding schemes is a function of an identifier of the terminal device and a different one of the predetermined number of times that the transmission of the control information is repeatable.

17. A base station according to clause 14, wherein:
the controller is operable to apply the coding scheme used for coding the control information onto information bits prior to channel encoding of a signal comprising the control information which is to be transmitted to the terminal device.

18. A base station according to clause 14, wherein:
the controller is operable to apply the coding scheme used for coding the control information to a signal comprising the control information which is to be transmitted to the terminal device after channel encoding of the signal.

19. A base station according to clause 14, wherein:
the controller is operable to apply the coding scheme used for coding the control information onto the symbol of the modulated and channel encoded control information which is to be transmitted to the terminal device.

20. A base station according to clause 14, wherein:
the controller is operable to apply the coding scheme used for coding the control information onto the radio resource elements of a pair of physical resource blocks (PRBs) of the modulated and channel encoded control information which is to be transmitted to the terminal device.

21. A base station according to any one of clauses 14 to 20, wherein:
a first and second number of times that the transmission of the control information is repeatable are each associated with the same, shared coding scheme.

22. A base station according to clause 21, wherein:
the controller is operable to add an identifier to the control information when the transmission of the control information is to be repeated the first or second number of times, the identifier identifying which of the first or second number of times the transmission of the control information is to be repeated.

23. A base station according to any one of clauses 13 to 22, wherein the coding is one of scrambling or interleaving and the decoding is one of descrambling or de-interleaving.

24. A terminal device according to any one of clauses 14 to 23, wherein the predetermined coding schemes are one of scrambling codes or interleaving functions.

25. A wireless telecommunications system comprising a terminal device according to clause 1 and a base station according to clause 13.

26. A method of operating a terminal device in a wireless telecommunications system, the terminal device being for performing radio signalling with a base station using a predetermined narrowband of the bandwidth of the wireless telecommunications system, the method comprising:
- receiving control information from the base station in a coverage extension mode of the wireless telecommunications system, wherein: the control information schedules radio resources for radio signalling with the base station; the coverage extension mode is a mode in which transmission of the control information to the terminal device is repeated a plurality of times; and the control information is coded according to the number of times that the transmission of the control information is repeated;
- decoding the control information to determine the number of times that the transmission of the control information is repeated; and
- performing radio signalling with the base station using the radio resources scheduled by the control information after a predetermined time period following the final repeat transmission of the control information has elapsed.

27. A storage medium storing a computer program for controlling a computer to perform a method according to clause 26.

28. A method of operating a base station in a wireless telecommunications system, the base station being for performing radio signalling with a terminal device using a predetermined narrowband of the bandwidth of the wireless telecommunications system, the method comprising:
- generating control information to be transmitted to the terminal device in a coverage extension mode of the wireless telecommunications system, wherein: the control information schedules radio resources for radio signalling with the terminal device; and the coverage extension mode is a mode in which transmission of the control information to the terminal device is repeated a plurality of times;
- determining the number of times that transmission of the control information to the terminal device is to be repeated;
- coding the control information according to the determined number of times that the transmission of the control information to the terminal device is to be repeated;
- repeatedly transmitting the coded control information to the terminal device according to the determined number of times that the transmission of the control information to the terminal device is to be repeated; and
- performing radio signalling with the terminal device using the radio resources scheduled by the control information after a predetermined time period following the final repeat transmission of the control information has elapsed.

29. A storage medium storing a computer program for controlling a computer to perform a method according to clause 28.

30. A terminal device for use in a wireless telecommunications system, the terminal device comprising:
- transceiver circuitry operable to perform radio signalling with a base station using a predetermined narrowband of the bandwidth of the wireless telecommunications system; and
- controller circuitry operable to:
- control the transceiver circuitry to receive control information from the base station in a coverage extension mode of the wireless telecommunications system, wherein: the control information schedules radio resources for radio signalling with the base station; the coverage extension mode is a mode in which transmission of the control information to the terminal device is repeated a plurality of times; and the control information is coded according to the number of times that the transmission of the control information is repeated;
- decode the control information to determine the number of times that the transmission of the control information is repeated; and
- control the transceiver circuitry to perform radio signalling with the base station using the radio resources scheduled by the control information after a predetermined time period following the final repeat transmission of the control information has elapsed.

31. A base station for use in a wireless telecommunications system, the base station comprising:
- transceiver circuitry operable to perform radio signalling with a terminal device using a predetermined narrowband of the bandwidth of the wireless telecommunications system; and
- a controller circuitry operable to:
- generate control information to be transmitted to the terminal device in a coverage extension mode of the wireless telecommunications system, wherein: the control information schedules radio resources for radio signalling with the terminal device; and the coverage extension mode is a mode in which transmission of the control information to the terminal device is repeated a plurality of times;
- determine the number of times that transmission of the control information to the terminal device is to be repeated;
- code the control information according to the determined number of times that the transmission of the control information to the terminal device is to be repeated;
- control the transceiver circuitry to repeatedly transmit the coded control information to the terminal device according to the determined number of times that the transmission of the control information to the terminal device is to be repeated; and
- control the transceiver circuitry to perform radio signalling with the terminal device using the radio resources scheduled by the control information after a predetermined time period following the final repeat transmission of the control information has elapsed.

Various further aspects and features of the present invention are defined in the appended claims and various combinations of the features of the dependent claims may be made with those of the independent claims other than the specific combinations recited for the claim dependency. Modifications may also be made to the embodiments hereinbefore described without departing from the scope of the present invention. For instance, although a feature may appear to be described in connection with particular embodiments, one skilled in the art would recognise that various features of the described embodiments may be combined in accordance with the disclosure.

Annex 1:

The simplified structure of the downlink of an LTE wireless access interface presented in FIG. 2, also includes an illustration of each subframe 201, which comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel (PDCCH), a physical control format indicator channel (PCFICH) and a physical HARQ indicator channel (PHICH). The data region may contain a number of physical channel for the transmission of data, such as a physical downlink communications channel (PDSCH) and a physical broadcast channels (PBCH). Although these physical channels provide a wide range of functionality to LTE systems, in terms of resource allocation and the present disclosure PDCCH and PDSCH are most relevant. Further information on the structure and functioning of the physical channels of LTE systems can be found in [1].

Resources within the PDSCH may be allocated by an base station to UEs being served by the base station. For example, a number of resource blocks of the PDSCH may be allocated to a UE in order that it may receive data that it has previously requested or data which is being pushed to it by the base station, such as radio resource control (RRC) signalling. In FIG. 2, UE1 has been allocated resources 208 of the data region 206, UE2 resources 209 and UE resources 210. UEs in a an LTE system may be allocated a fraction of the available resources of the PDSCH and therefore UEs are required to be informed of the location of their allocated resources within the PDSCH so that only relevant data within the PDSCH is detected and estimated. In order to inform the UEs of the location of their allocated communications resource elements, resource control information specifying downlink resource allocations is conveyed across the PDCCH in a form termed downlink control information (DCI), where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Each uplink subframe may include a plurality of different channels, for example a physical uplink communications channel (PUSCH) 305, a physical uplink control channel (PUCCH) 306, and a physical random access channel (PRACH). The physical Uplink Control Channel (PUCCH) may carry control information such as ACK/NACK to the base station for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals (DMRS) 307 and sounding reference signals (SRS) 308 may be present in an uplink subframe where the DMRS occupy the fourth symbol of a slot in which PUSCH is transmitted and are used for decoding of PUCCH and PUSCH data, and where SRS are used for uplink channel estimation at the base station. Further information on the structure and functioning of the physical channels of LTE systems can be found in [1].

In an analogous manner to the resources of the PDSCH, resources of the PUSCH are required to be scheduled or granted by the serving base station and thus if data is to be transmitted by a UE, resources of the PUSCH are required to be granted to the UE by the base station. At a UE, PUSCH resource allocation is achieved by the transmission of a scheduling request or a buffer status report to its serving base station. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the base station is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the base station and gives the base station information regarding the amount of data in an uplink buffer or buffers at the UE. After receiving the buffer status report, the base station can allocate a portion of the PUSCH resources to the sending UE in order to transmit some of its buffered uplink data and then inform the UE of the resource allocation via a DCI in the PDCCH. For example, presuming a UE has a connection with the base station, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating base station, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an base station is required if UEs, even when in close proximity, wish to communicate with one another. These limitations may be problematic when the system is experiencing high load or base station coverage is not available, for instance in remote areas or when base stations are not functioning correctly. Overcoming these limitations may increase both the capacity and efficiency of LTE networks but also lead to the creations of new revenue possibilities for LTE network operators.

REFERENCES

[1] LTE for UMTS: OFDMA and SC-FDMA Based Radio Access, Harris Holma and Antti Toskala, Wiley 2009, ISBN 978-0-470-99401-6.

The invention claimed is:

1. A terminal device for use in a wireless telecommunications system, the terminal device comprising:
   a transceiver configured to perform radio signalling with a base station using a predetermined narrowband of a bandwidth of the wireless telecommunications system, and
   a controller configured to:
      control the transceiver to receive control information from the base station in a coverage extension mode of the wireless telecommunications system, wherein the control information schedules radio resources for the radio signalling with the base station, the coverage extension mode is a mode in which a transmission of the control information to the terminal device is repeated a plurality of times, and the control information is coded according to a coding scheme associated with a number of times that the transmission of the control information is repeated;
      perform a decoding process using the coding scheme to decode the control information;
      determine the number of times that the transmission of the control information is repeated according to a particular number corresponding to the coding scheme; and
      control the transceiver to perform the radio signalling with the base station using the radio resources scheduled by the control information after a predetermined time period has elapsed following a final repeat transmission of the control information.

2. The terminal device according to claim 1, wherein the coding scheme is one of a plurality of predetermined coding schemes that are each associated with a respective number of times that the transmission of the control information is repeatable, and
the controller is further configured to:
   perform a decoding process using each coding scheme in the plurality of predetermined coding schemes;
   determine which coding scheme in the plurality of predetermined coding schemes successively decodes the control information; and
   determine the particular number of times that the transmission of the control information is repeatable, which is associated with the coding scheme which successively decodes the control information, as the number of times that the transmission of the control information is repeated.

3. The terminal device according to claim 2, wherein the coding scheme used for coding the control information is masked onto a cyclic redundancy check (CRC) of a signal comprising the control information which is transmitted to the terminal device by the base station, and
the controller is configured to perform the decoding process using each coding scheme in the plurality of predetermined coding schemes by applying each coding scheme to the CRC of the signal comprising the control information which is received from the base station.

4. The terminal device according to claim 3, wherein each coding scheme in the plurality of predetermined coding schemes is a function of an identifier of the terminal device and a different one of the predetermined number of times that the transmission of the control information is repeatable.

5. The terminal device according to claim 2, wherein
   the coding scheme used for coding the control information is applied onto information bits prior to channel encoding of a signal comprising the control information which is transmitted to the terminal device by the base station, and
   the controller is configured to perform the decoding process using each coding scheme in the plurality of predetermined coding schemes by applying each coding scheme to the signal comprising the control information which is received from the base station after channel decoding of the signal.

6. The terminal device according to claim 2, wherein
   the coding scheme used for coding the control information is applied to a signal comprising the control information which is transmitted to the terminal device by the base station after channel encoding of the signal, and
   the controller is configured to perform the decoding process using each coding scheme in the plurality of predetermined coding schemes by applying each coding scheme to the signal comprising the control information which is received from the base station prior to channel decoding of the signal.

7. The terminal device according to claim 2, wherein
   the coding scheme used for coding the control information is applied onto the symbol of the modulated & channel encoded control information which is transmitted to the terminal device by the base station, and
   the controller is configured to perform the decoding process using each coding scheme in the plurality of predetermined coding schemes by applying each coding scheme to the symbol of the modulated and channel encoded control information which is received from the base station.

8. The terminal device according to claim 2, wherein
   the coding scheme used for coding the control information is applied onto the radio resource elements of a pair of physical resource blocks (PRBs) of the modulated and channel encoded control information which is transmitted to the terminal device by the base station, and
   the controller is configured to perform the decoding process using each coding scheme in the plurality of predetermined coding schemes by applying each coding scheme to the radio resource elements of the pair of PRBs of the modulated and channel encoded control information which is received from the base station.

9. The terminal device according to claim 2, wherein a first and second number of times that the transmission of the control information is repeatable are each associated with the same, shared coding scheme.

10. The terminal device according to claim 9, wherein the controller is configured to, following decoding of control information using the shared coding scheme, determine the number of times that the control information is repeated based on an identifier in the control information.

11. The terminal device according to claim 1, wherein the coding is one of scrambling or interleaving and the decoding is one of descrambling or de-interleaving.

12. The terminal device according to claim 2, wherein the predetermined coding schemes are one of scrambling codes or interleaving functions.

13. A method of operating a terminal device in a wireless telecommunications system, the terminal device being for performing radio signalling with a base station using a predetermined narrowband of a bandwidth of the wireless telecommunications system, the method comprising:
receiving control information from the base station in a coverage extension mode of the wireless telecommunications system, wherein the control information schedules radio resources for the radio signalling with the base station, the coverage extension mode is a mode in which a transmission of the control information to the terminal device is repeated a plurality of times, and the control information is coded according to a coding scheme associated with a number of times that the transmission of the control information is repeated;
performing a decoding process using the coding scheme to decode the control information;
determining the number of times that the transmission of the control information is repeated according to a particular number corresponding to the coding scheme; and
performing the radio signalling with the base station using the radio resources scheduled by the control information after a predetermined time period has elapsed following a final repeat transmission of the control information.

14. A terminal device for use in a wireless telecommunications system, the terminal device comprising:
transceiver circuitry configured to perform radio signalling with a base station using a predetermined narrowband of a bandwidth of the wireless telecommunications system; and
controller circuitry configured to:
control the transceiver circuitry to receive control information from the base station in a coverage extension mode of the wireless telecommunications system, wherein the control information scheduling radio resources for the radio signalling with the base station, the coverage extension mode is a mode in which a transmission of the control information to the terminal device is repeated a plurality of times, and the control information is coded according to a coding scheme associated with a number of times that the transmission of the control information is repeated;
perform a decoding process using the coding scheme to decode the control information;
determine the number of times that the transmission of the control information is repeated according to a particular number corresponding to the coding scheme; and
control the transceiver circuitry to perform the radio signalling from the base station using the radio resources scheduled by the control information after a predetermined time period has elapsed following a final repeat transmission of the control information.

15. The terminal device according to claim 14, wherein the coding scheme is one of a plurality of predetermined coding schemes that are each associated with a respective number of times that the transmission of the control information is repeatable, and
the controller circuitry is further configured to:
perform a decoding process using each coding scheme in the plurality of predetermined coding schemes;
determine which coding scheme in the plurality of predetermined coding schemes successively decodes the control information; and
determine the particular number of times that the transmission of the control information is repeatable, which is associated with the coding scheme which successively decodes the control information, as the number of times that the transmission of the control information is repeated.

16. The terminal device according to claim 15, wherein the coding scheme used for coding the control information is masked onto a cyclic redundancy check (CRC) of a signal comprising the control information which is transmitted to the terminal device by the base station, and
the controller circuitry is configured to perform the decoding process using each coding scheme in the plurality of predetermined coding schemes by applying each coding scheme to the CRC of the signal comprising the control information which is received from the base station.

17. The terminal device according to claim 16, wherein each coding scheme in the plurality of predetermined coding schemes is a function of an identifier of the terminal device and a different one of the predetermined number of times that the transmission of the control information is repeatable.

18. The terminal device according to claim 15, wherein the coding scheme used for coding the control information is applied onto information bits prior to channel encoding of a signal comprising the control information which is transmitted to the terminal device by the base station, and
the controller circuitry is configured to perform the decoding process using each coding scheme in the plurality of predetermined coding schemes by applying each coding scheme to the signal comprising the control information which is received from the base station after channel decoding of the signal.

19. The terminal device according to claim 15, wherein the coding scheme used for coding the control information is applied to a signal comprising the control information which is transmitted to the terminal device by the base station after channel encoding of the signal, and
the controller circuitry is configured to perform the decoding process using each coding scheme in the plurality of predetermined coding schemes by applying each coding scheme to the signal comprising the control information which is received from the base station prior to channel decoding of the signal.

20. The terminal device according to claim 15, wherein the coding scheme used for coding the control information is applied onto the symbol of the modulated & channel encoded control information which is transmitted to the terminal device by the base station, and
the controller circuitry is configured to perform the decoding process using each coding scheme in the plurality of predetermined coding schemes by applying each coding scheme to the symbol of the modulated and channel encoded control information which is received from the base station.

* * * * *